April 6, 1965     H. R. DUTTON     3,176,388
METHOD FOR SHOCK ABSORBER MANUFACTURE
Filed Sept. 29, 1961     8 Sheets-Sheet 1

INVENTOR.
HAROLD R. DUTTON
BY
D. C. Staley
HIS ATTORNEY

INVENTOR.
HAROLD R. DUTTON
BY
D. C. Staley
HIS ATTORNEY

April 6, 1965  H. R. DUTTON  3,176,388
METHOD FOR SHOCK ABSORBER MANUFACTURE
Filed Sept. 29, 1961  8 Sheets-Sheet 4

INVENTOR.
HAROLD R. DUTTON
BY
D.C. Staley
HIS ATTORNEY

INVENTOR.
HAROLD R. DUTTON
BY
D.C. Staley
HIS ATTORNEY

April 6, 1965  H. R. DUTTON  3,176,388
METHOD FOR SHOCK ABSORBER MANUFACTURE
Filed Sept. 29, 1961  8 Sheets-Sheet 6

INVENTOR.
HAROLD R. DUTTON
BY
D.C. Staley
HIS ATTORNEY

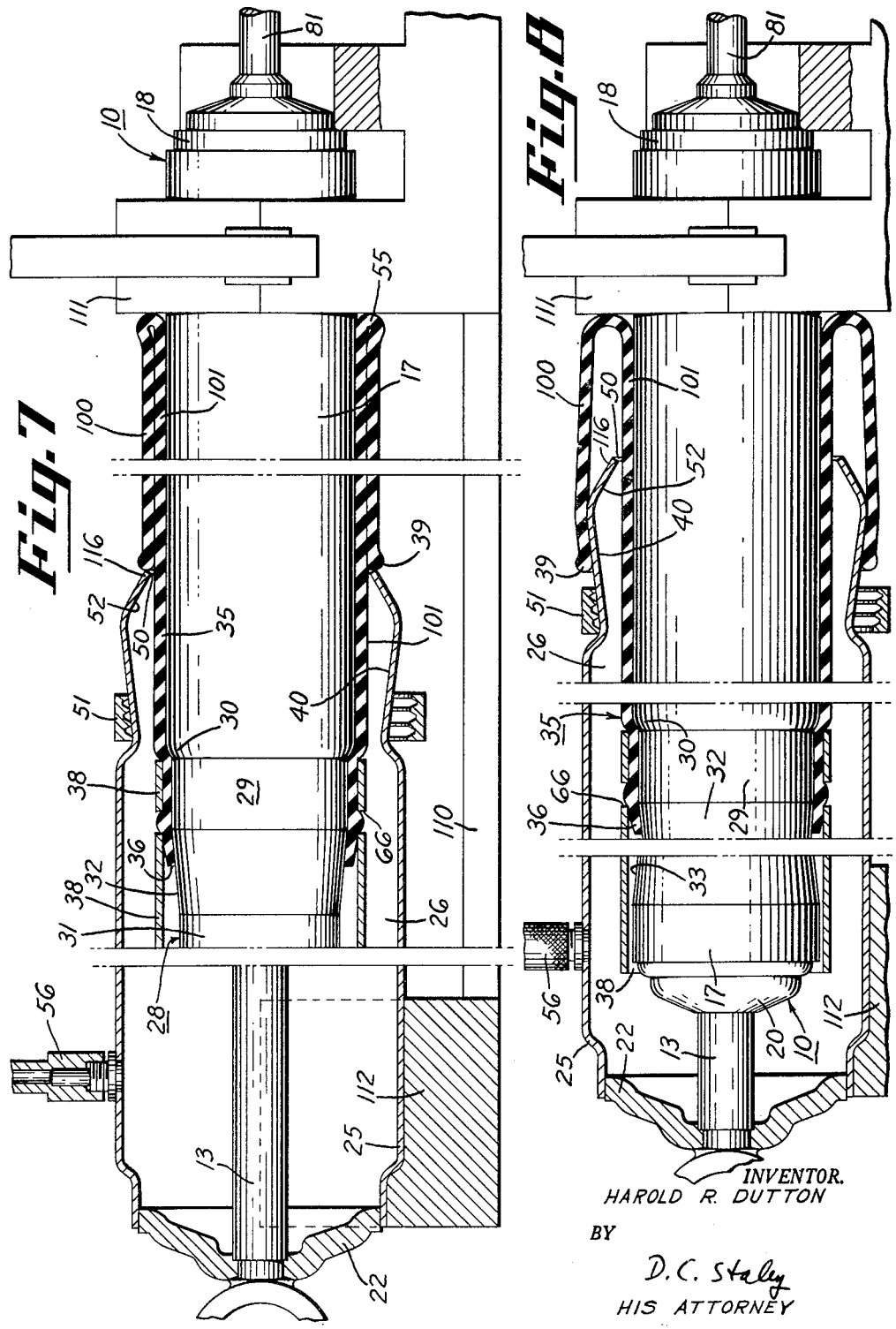
April 6, 1965  H. R. DUTTON  3,176,388
METHOD FOR SHOCK ABSORBER MANUFACTURE
Filed Sept. 29, 1961  8 Sheets-Sheet 7
INVENTOR.
HAROLD R. DUTTON
BY
D.C. Staley
HIS ATTORNEY April 6, 1965 H. R. DUTTON 3,176,388
METHOD FOR SHOCK ABSORBER MANUFACTURE
Filed Sept. 29, 1961 8 Sheets-Sheet 8
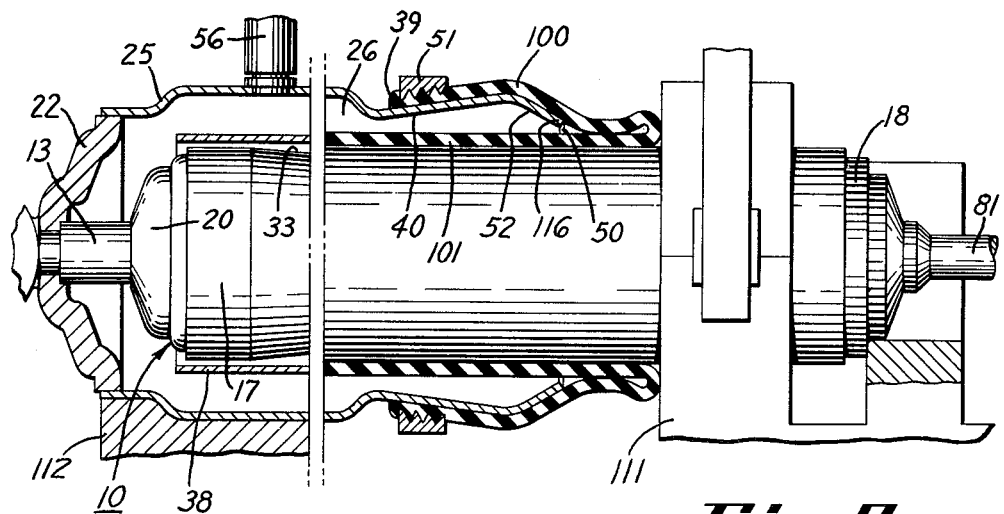
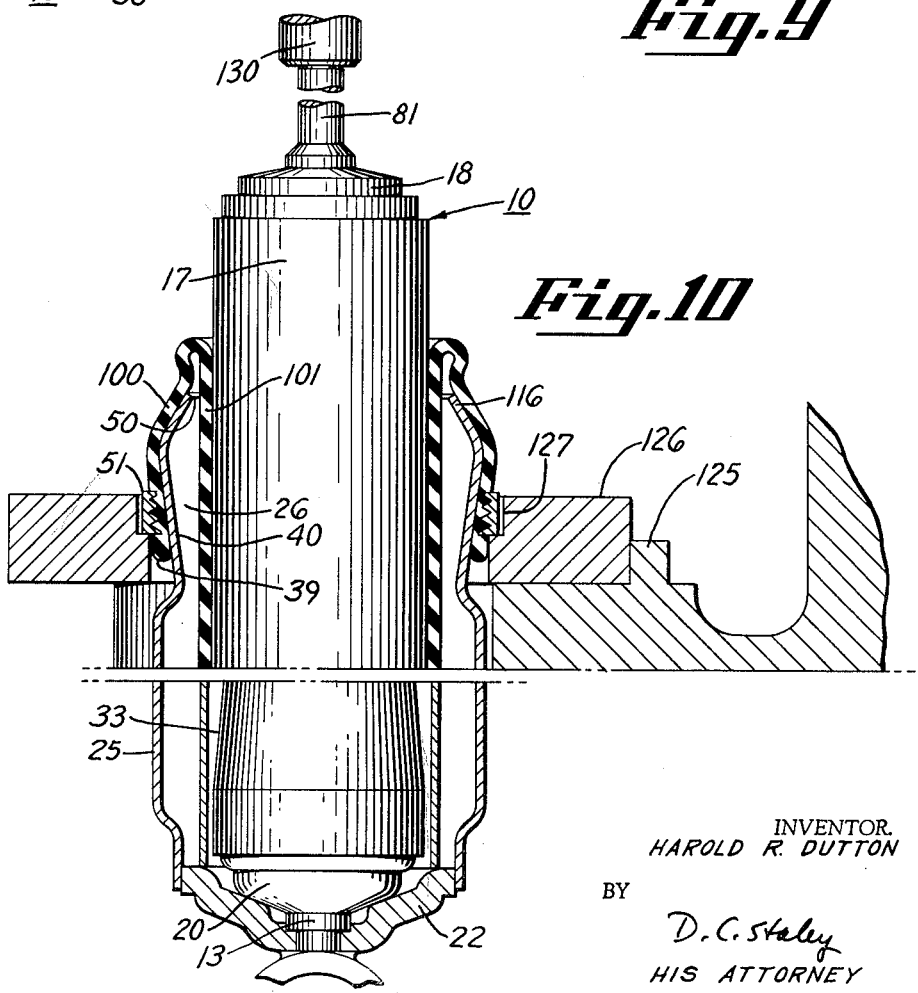
INVENTOR.
HAROLD R. DUTTON
BY
D. C. Staley
HIS ATTORNEY

United States Patent Office 3,176,388
Patented Apr. 6, 1965

3,176,388
METHOD FOR SHOCK ABSORBER
MANUFACTURE
Harold R. Dutton, Dayton, Ohio, assignor to General
Motors Corporation, Detroit, Mich., a corporation of
Delaware
Filed Sept. 29, 1961, Ser. No. 141,861
5 Claims. (Cl. 29—450)

This invention relates to a method for manufacturing and assembling a combination shock absorber and air spring unit wherein a flexible rolling type diaphragm is used as a part of a wall structure defining an air pressure receiving chamber surrounding a direct-acting tubular type shock absorber so that the shock absorber and the air chamber forming an air spring will cooperate with one another in normal reciprocating movement of the shock absorber.

Specifically, the invention relates to a method of assembling a generally cylindrical flexible rolling type diaphragm on the exterior shell of a direct-acting tubular shock absorber and attaching opposite ends of the rolling diaphragm to the exterior shell of the shock absorber and to a cylindrical wall around the exterior shell that forms a part of the air chamber providing the air spring around the shock absorber.

An object of the invention is to provide a method to facilitate assembly of a cylindrical flexible wall onto the exterior or outer shell of a shock absorber and attach opposite ends of the flexible wall to the shell of the shock absorber and to a rigid shell member in spaced relationship to the outer shell of the shock absorber so as to provide thereby a flexible closure wall of an air chamber operating as an air spring with the shock absorber.

Further objects and advantages of the present invention will be apparent from the following description, reference being had to the accompanying drawings wherein preferred embodiments of the present invention are clearly shown.

In the drawings:

FIGURE 7 is a cross-sectional view illustrating the method step of initiating placement of a turned-back portion of the cylindrical wall of a rolling flexible diaphragm onto a shell member that is in spaced relation to the outer shell of the shock absorber.

FIGURE 8 is a cross-sectional view similar to FIGURE 7 but illustrating a further step in the method initiated by the illustration of FIGURE 7.

FIGURE 9 is a cross-sectional view similar to FIGURE 8 but showing the completion of the method step of placing an end portion of the flexible rolling diaphragm onto the end portion of a shell member that is in spaced relation to the outer shell of the shock absorber.

FIGURE 10 is a cross-sectional view illustrating the final step of setting a locking ring on the turned-back end of the flexible wall of the rolling diaphragm to frictionally secure it to a shell member that is in spaced relation to the shock absorber shell.

Figure 1:
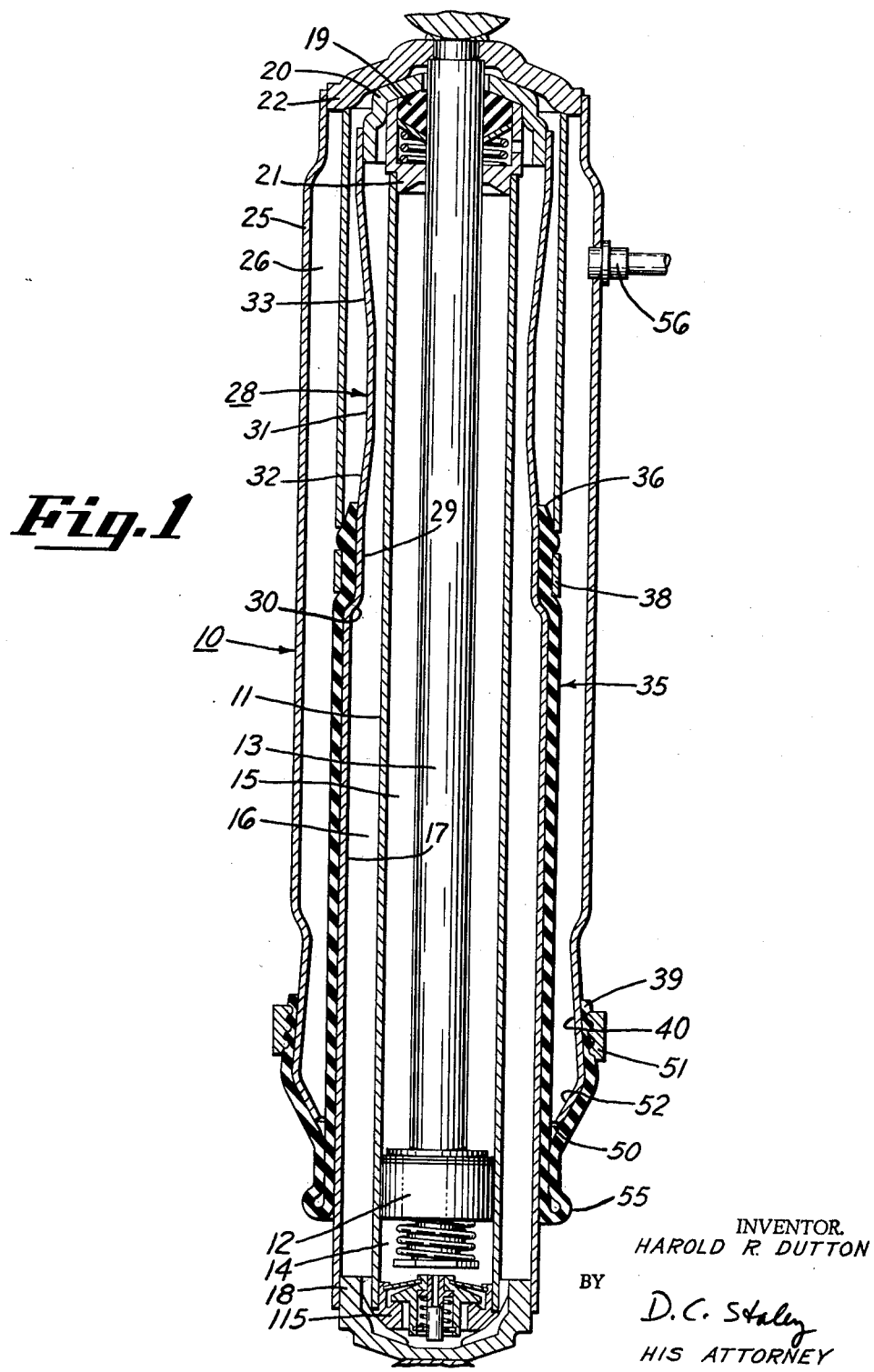
FIGURE 1 illustrates a vertical cross-sectional view of a shock absorber assembled according to the method of this invention.

The shock absorber to which the method of this invention applies is illustrated in FIGURE 1 of the drawings and is more specifically illustrated and described in a copending application of Paul J. Long, Jr., Serial No. 52,882, filed August 30, 1960.

The shock absorber identified by the reference numeral 10 consists of a working cylinder 11 providing a cylinder bore receiving the piston 12 carried on the end of a rod 13 to divide the working cylinder 11 into a compression chamber 14 and a rebound chamber 15. The piston 12 is provided with the usual passages through the same for flow of hydraulic fluid between the rebound chamber and the compression chamber during reciprocation of the piston in the cylinder 11.

The lower end of the cylinder 11 carries a base valve 115 adapted to provide for interchange of hydraulic fluid between the compression chamber 14 and the reservoir chamber 16 provided by the outer shell 17 of the shock absorber that also forms the reservoir shell. An end closure member 18 is provided between the cylinder 11 and the reservoir shell 17.

The upper end of the working cylinder 11 carries a rod seal member 19 confined by a closure cap 20 secured on the upper end of the reservoir shell 17 and through which the rod 13 extends. A rod guide member 21 is supported between the upper end of the cylinder 11 and the closure cap 20 and retains the rod seal 19.

The upper end of the rod 13 carries a cap member 22 that in turn supports a rigid shell member 25 that is in spaced relation to the outer shell 17 of the shock absorber so as to provide an air space 26.

Before assembly of the shock absorber, the outer shell 17 is provided with an annular recessed portion 28 that is of smaller diameter than the diameter of the main body of the outer shell 17. This recess portion 28 consists of a first cylindrical portion 29 adjacent a shoulder portion 30 formed between the reduced diameter cylindrical portion 29 and the main body of the shell 17. The cylindrical portion 29 is coextensive with a second reduced diameter portion or recessed portion 31 that has one end connected with the cylindrical portion 29 by a tapered wall section 32 and has the opposite end thereof connected with the shell 17 by the tapered wall portion 33.

A generally cylindrical rolling diaphragm 35 has one end 36 thereof in frictional sealing engagement with the cylindrical portion 29 of the shell 17 as retained thereon by the cylindrical sleeve 38. The opposite end 39 of the rolling diaphragm 35 is retained in frictional sealing engagement with the truncated cone portion 40 of the open end 50 of the shell member 25, the end 39 of the diaphragm being held in sealing frictional engagement with the truncated cone portion 40 by means of a retaining ring 51. The truncated cone portion 40 is of a receding diameter axially of the shock absorber as viewed toward the rod end of the shock absorber and the truncated cone portion 52 is of an increasing diameter taken in the axial direction toward the rod end of the shock absorber. The inner end or open end 50 of the portion 52 and therefore the shell 25 is positioned closely adjacent the flexible wall of the rolling diaphragm 35.

The rolling diaphragm 35 is formed or turned backwardly upon itself through the return bend portion 55 so that the end portion 39 can be positioned upon the open end of the shell member 25 and secured thereto in a manner heretofore described. A fitting 56 is provided in the shell 25 through which air under pressure can be admitted into the air space 26 during operation of the shock absorber so that the air space 26 together with the wall structure that defines the air space forms an air spring element that cooperates with the shock absorber 10, all of which is more fully disclosed and described in the co-pending application heretofore mentioned.

The method of assembling the flexible cylindrical rolling diaphragm wall 35 onto the shock absorber illustrated in FIGURE 1 is more specifically illustrated in FIGURES 2 to 10 inclusive.

Figure 2:
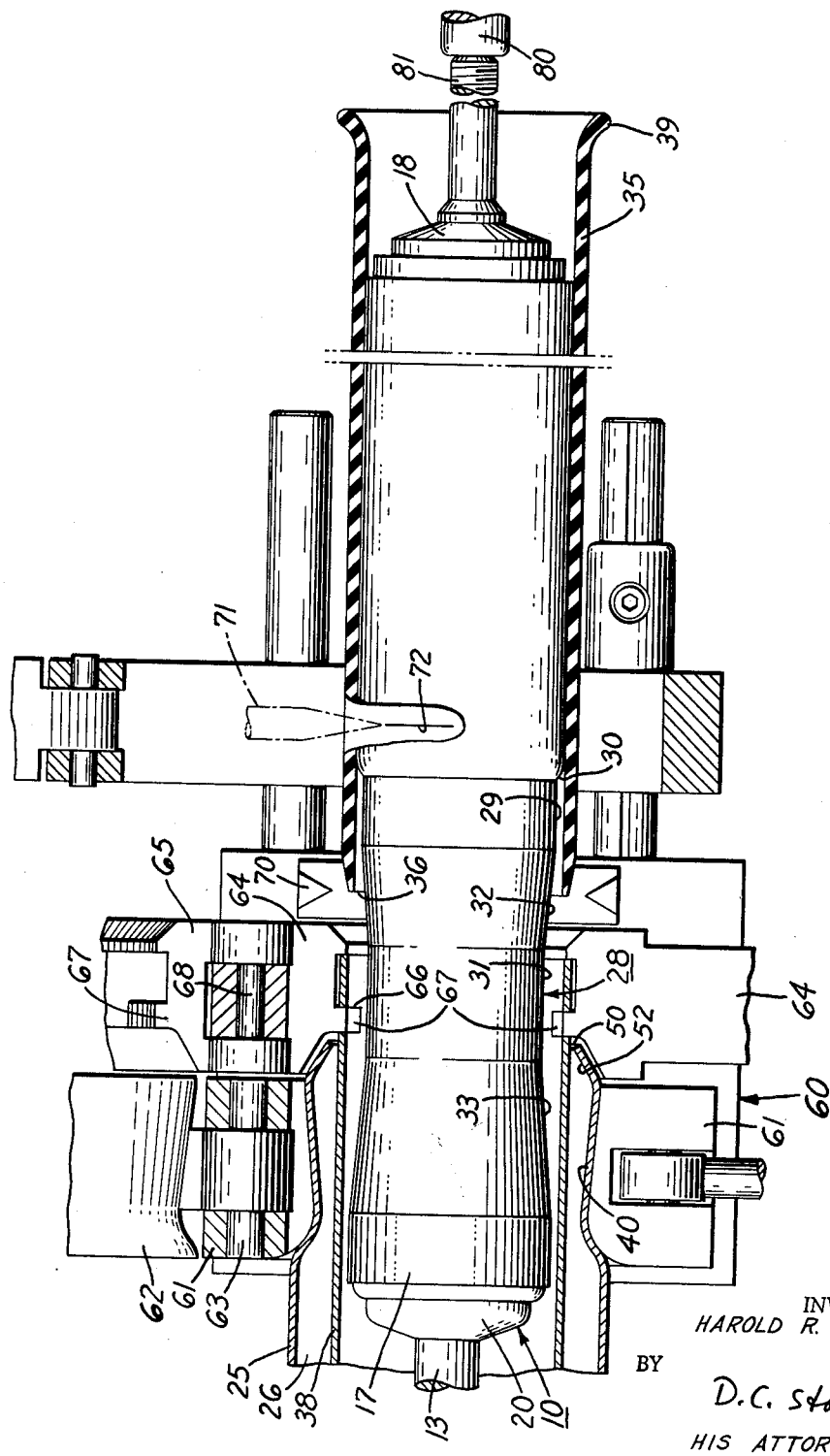
FIGURE 2 is a horizontal cross-sectional view of a fixture in which the first step of the method of assembly of a flexible cylindrical wall is performed upon a direct-acting tubular shock absorber.

In FIGURE 2 there is illustrated a fixture in which a shock absorber assembly is clamped for the initial step of assembling the rolling diaphragm wall 35 upon the shock absorber 10. The fixture consists of a bed 60 having a two-part clamp 61, 62 pivoted together by the pivot pin 63 by which the upper half of the clamp 62 is adapted to close upon the lower half around the shell member 25 that is assembled on the shock absorber 10. As shown in FIGURE 2, the shell member 25 has the open end portion 40 thereof positioned within the suitably contoured members 61 and 62 so that when the members 61 and 62 are closed upon one another, the shell 25 is retained in position on the fixture in a manner that is immovable axially relative to the fixture.

A second two-part holding clamp consisting of parts 64 and 65 are adapted to be positioned around the lower end of the retaining sleeve 38 in a manner shown in FIGURE 2 with the slot portions 66 in the retaining sleeve 38 filled by the annular ridge portions 67 on the parts 64 and 65. The upper holding member 65 is pivoted to the lower member 64 by pivot pin 68.

With the shock absorber 10 positioned in the holding fixture 60 in the manner shown in FIGURE 2, the workman manually applies a cylindrical flexible tubular diaphragm wall 35 over the outer periphery of the outer shell of the shock absorber 10. The inner diameter of the cylindrical flexible tubular member 35 is sufficiently large that the member can be worked freely over the periphery of the outer shell of the shock absorber 10 to position the forward end 36 of the wall 35 adjacent a gage 70, at which position the wall 35 will then be held manually by the operator until a marking element 71 is moved down into engagement with the surface of the wall 35 to place a mark 72 thereon. It will, of course, be understood that during this processing the holding members are closed upon the shock absorber so that the shell 25 will not move axially in the holding fixture 60. Thereafter, the tapered section 32 and cylindrical portion 29 is coated with a suitable lubricant to enable later movement of the diaphragm 35 to its locked position.

With the mark 72 having been applied to the surface of the wall 35 in the manner shown in FIGURE 2, and with the holding elements of the holding fixture closed upon the shell 25, the workman then urges the forward end 36 of the tubular member or diaphragm wall 35 to a position wherein the forward end is placed between the recessed portion 28 on the outer shell 17 of the shock absorber and the retaining sleeve 38 that is held in position by the holding elements 64 and 65. The workman gages the position of the forward end 36 of the diaphragm wall 35 as judged by alignment of the marking 72 with the gage element 70.

Figure 3:
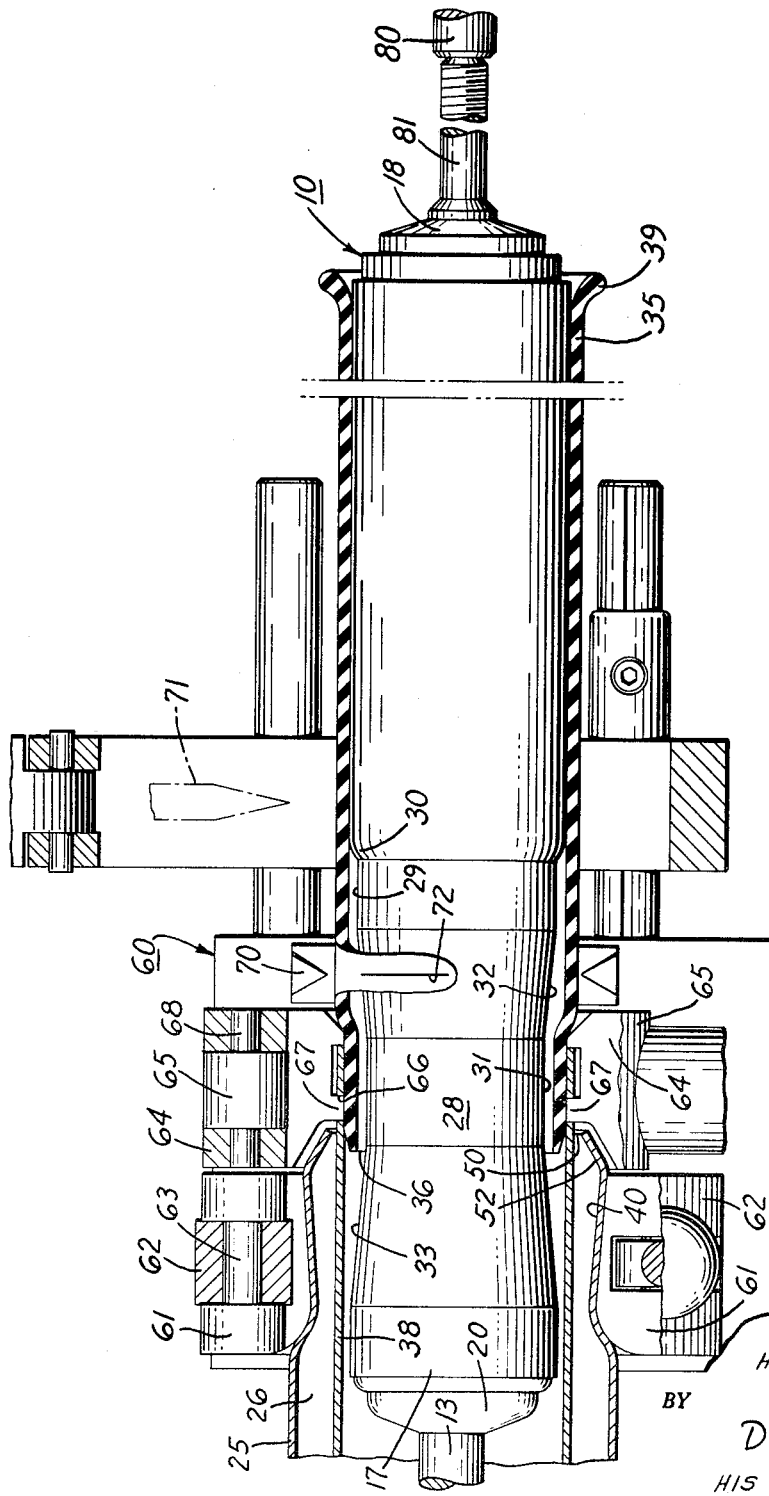
FIGURE 3 is a cross-sectional view similar to FIGURE 2 but showing a subsequent step of the method of assembly of the flexible tubular wall onto the outer shell of a shock absorber.
Figure 4:
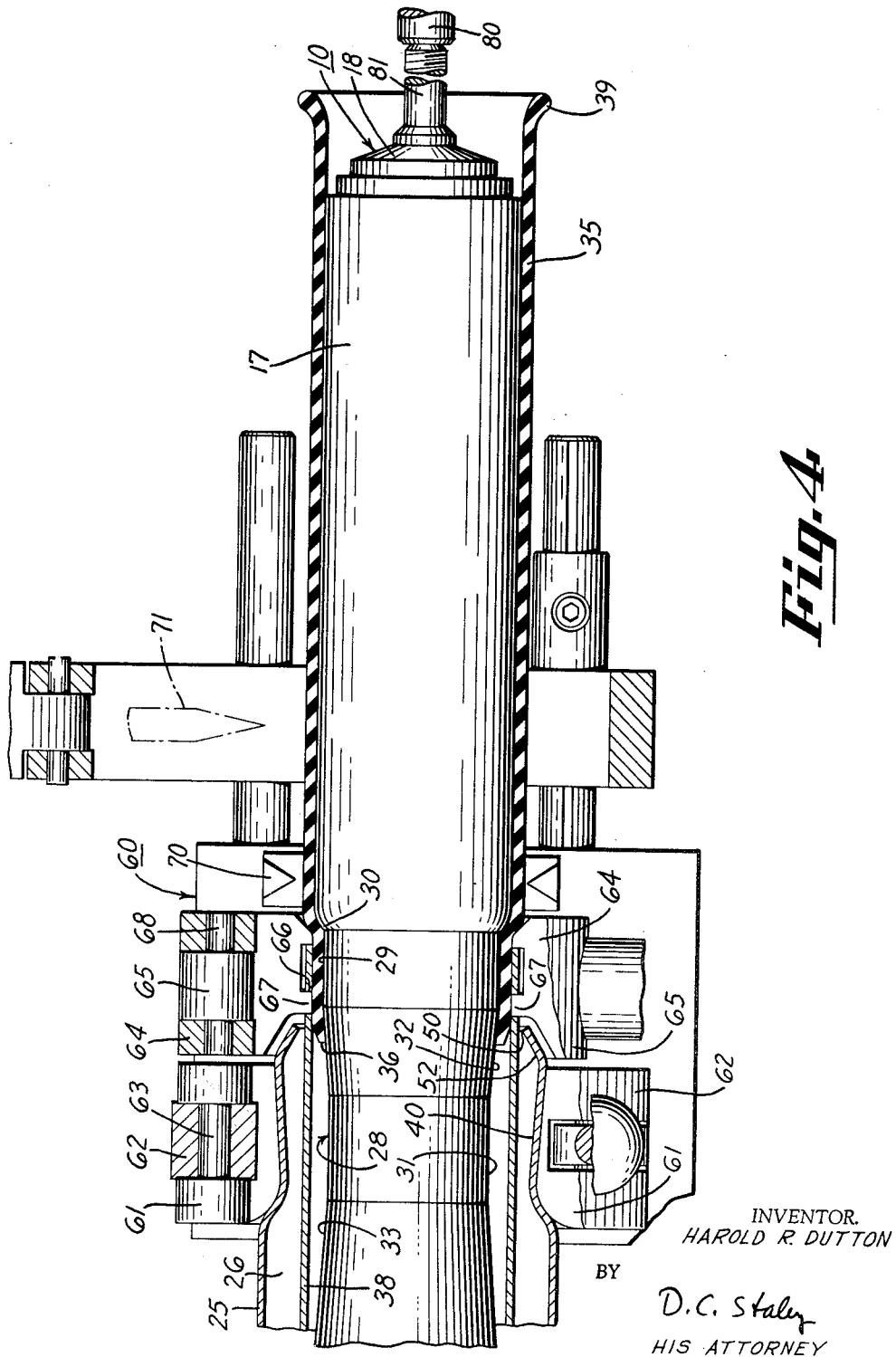
FIGURE 4 is a cross-sectional view similar to FIGURES 2 and 3 but showing the next step in the method of assembly of the flexible wall on the shock absorber.

With the diaphragm wall 35 now positioned in the manner shown in FIGURE 3, a force applying member or push rod 80 engages the mounting stud 81 on the base end of the shock absorber to move the shock absorber 10 axially into the retaining sleeve 38 and thereby causing the end 36 of the diaphragm wall 35 to be withdrawn from the recessed portion 28 upwardly over the angular surface 32 until it rests on the cylindrical surface 29 for frictional retention between the cylindrical portion 29 of the recessed area of the shock absorber and the sleeve 38 with the end of the sleeve 38 being in close proximity to the shoulder 30 in the manner shown in FIGURE 4. This step in the method of assembly of the rolling diaphragm sleeve 35 upon the shock absorber frictionally mounts the one end 36 of the rolling diaphragm sleeve 35 in sealing engagement with the outer shell of the shock absorber.

Upon completion of the operation illustrated in FIGURE 4, the workman removes the thus assembled shock absorber and rolling diaphragm sleeve 35 from the holding fixture 60 and places the thus assembled shock absorber into a second machine for additional processing in the assembly of the diaphragm sleeve 35.

Figure 5:
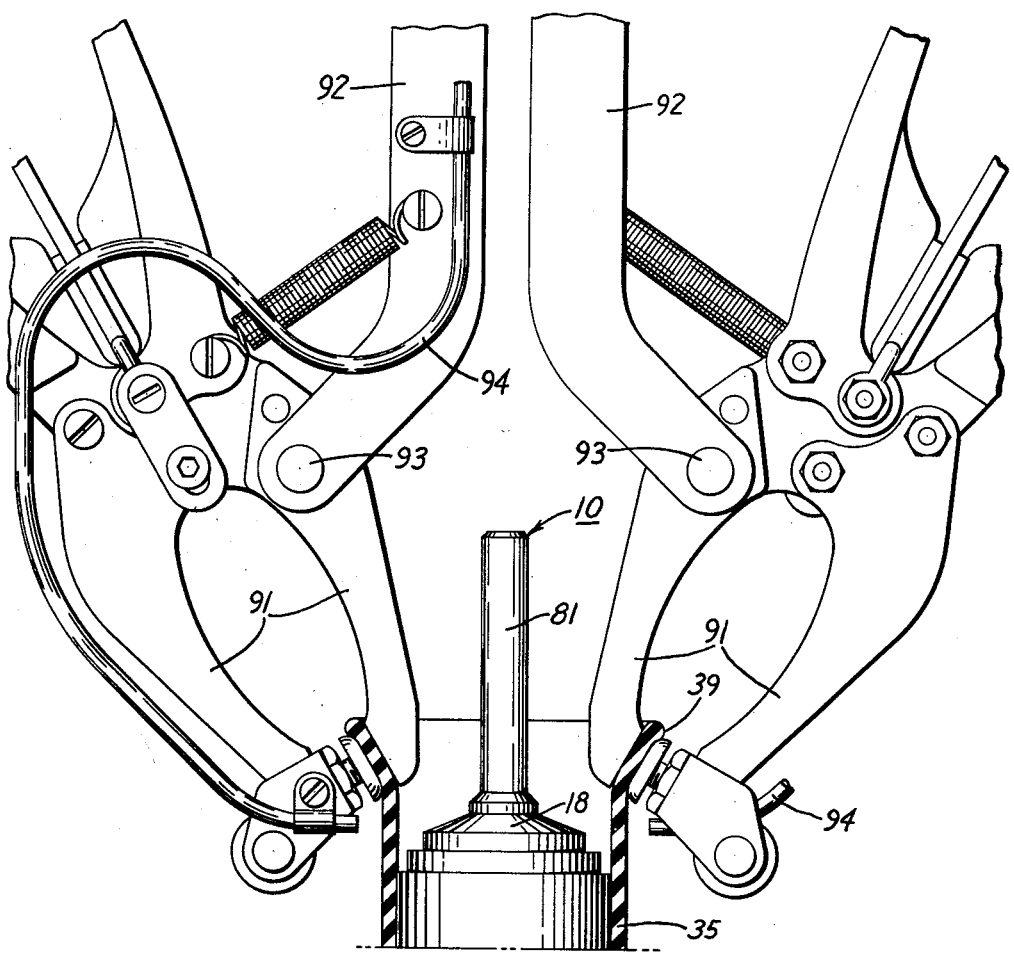
FIGURE 5 is a partial elevational and a partial cross-sectional view illustrating the step in the method of assembly of the flexible cylindrical wall on a shock absorber wherein the flexible wall is turned back upon itself to provide a double-walled or U-shaped wall structure.

In FIGURE 5 there is illustrated machine equipment to roll or fold the diaphragm 35 back upon itself to create the U-bend section 55 shown in FIGURE 1. As shown in FIGURE 5, the shock absorber is held in a holding fixture 90 with the holding fixture being clamped about the retaining sleeve 38. The opposite end 39 of the diaphragm sleeve 35 is secured between a plurality of clamping fingers 91 that are spaced around the periphery of the end 39 of the sleeve 35. These clamping fingers 91 are supported on force applying members 92 by means of pivots 93. A plurality of tubes 94 conduct air under pressure to the outer periphery of the sleeve 35 just below the engaging attachment of the clamping fingers 91 to the end 39 of the sleeve 35, as shown in FIGURE 5. When the clamping fingers 91 are moved downwardly from the position shown in FIGURE 5 to the position shown in FIGURE 6, the clamping fingers 91 rotate about the pivots 93 to cause the upper edge 39 of the sleeve 35 to be stretched outwardly and downwardly back upon itself and then as the fingers 91 move downwardly due to the force applying members 92, the rolling diaphragm 35 folds back upon itself in the manner shown in FIGURE 6. During this step in the method of turning the end portion of the diaphragm back upon itself, the air pressure emitting from the ends of the tubes 94 retains the wall portions 100 and 101 in spaced relationship so that substantially no friction is created in moving the wall portion 100 down upon the wall portion 101. Upon completion of the operation shown in FIGURE 6, the clamping fingers 91 are released and the shock absorber thus assembled is removed from the machine equipment.

Figure 6:
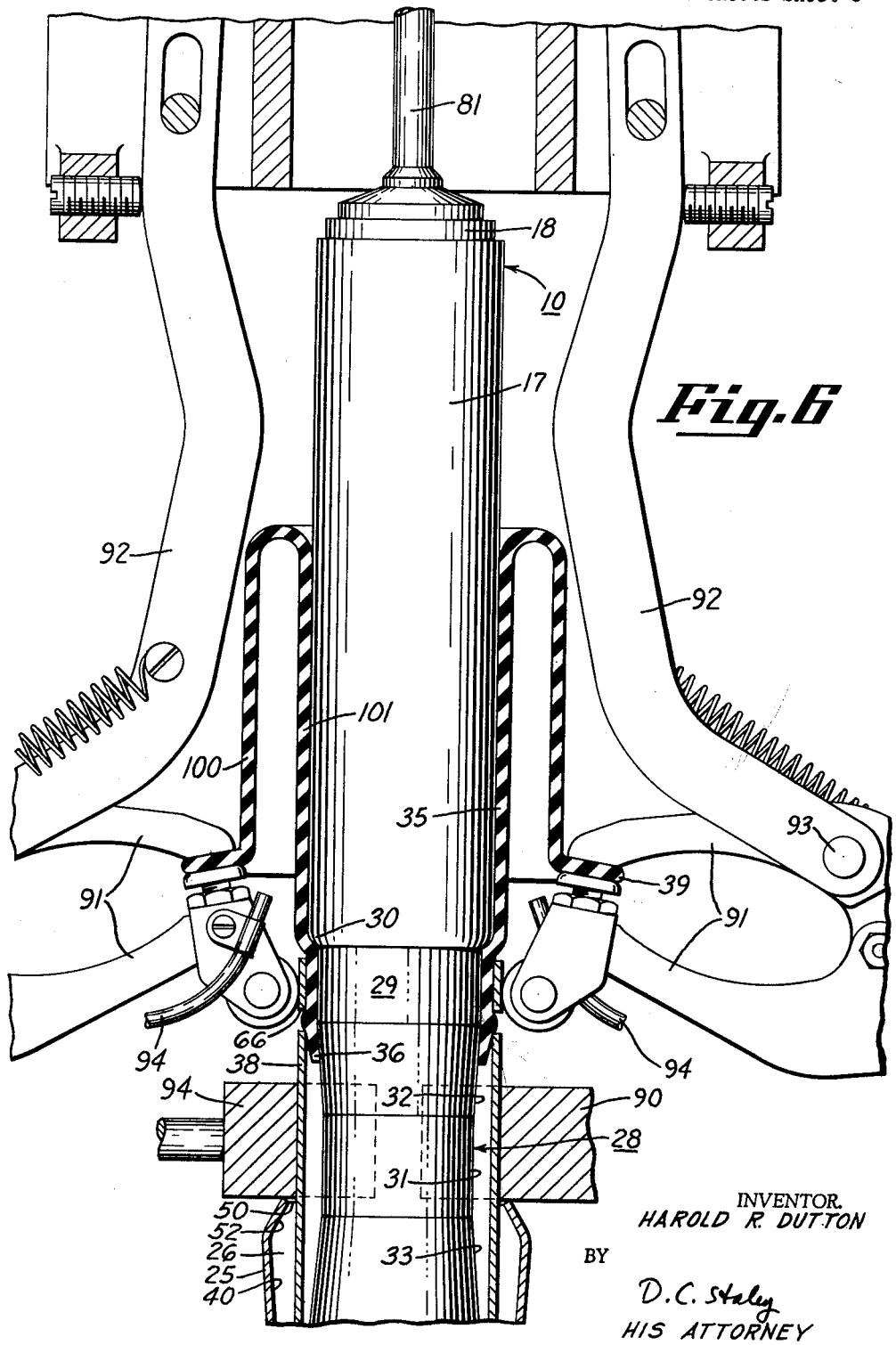
FIGURE 6 is a partial elevation and cross-sectional view similar to FIGURE 5 showing the completion of the method step initiated in FIGURE 5.

After the shock absorber is removed from the machine fixture in the assembled condition shown in FIGURE 6, the rod 13 of the shock absorber is pulled outwardly from the cylinder 11 to effect a substantial full extension of the shock absorber so that in the next step of the method of assembling the diaphragm sleeve 35 upon the shock absorber the outer shell 17 of the shock absorber can be moved axially relative to the shell member 25 for assembly of the opposite end 39 of the diaphragm sleeve 35 on the open end 40 of the sleeve 25.

In FIGURES 7 and 8 there is illustrated the step of assembly of the end 39 of the diaphragm 35 upon the open end of the shell member 25.

In FIGURE 7 there is illustrated the holding fixture 110 having a clamping member 111 at one end that is clamped around the outer shell 17 of the shock absorber 10. The shell member 25 is retained in a fixed holder 112 so that the shell 17 of the shock absorber can be moved axially to the left during the step of moving the end 39 of the rolling diaphragm 35 upon the open end of the shell member 25.

As shown in FIGURE 7, when the shock absorber is placed in the holding fixture the extreme end of the end portion 39 engages the tip end 116 of the truncated cone portion 52 of the end 40 of the member 25. Thus, when air under pressure is introduced through the fitting 56, the air will be delivered between the wall portions 100 and 101 of the diaphragm wall 35 to effect radial separation of these wall portions, as more particularly shown in FIGURE 8.

Concurrently with delivery of air in a manner heretofore described, the clamping member 111 together with the outer shell 17 of the shock absorber is moved axially in a left-hand direction so that the end portion 39 of the rolling diaphragm 35 is forced upwardly over the truncated cone portion 52 and thence downwardly over the truncated cone portion thereadjacent until it finally rests in a position shown in FIGURE 9.

At this time, the air pressure previously supplied to the space 26 through the fitting 56 can be disconnected so that the outer wall portion 100 now collapses upon the inner wall portion 101 and the operator of the equipment can place the retaining ring 51 upon the end portion 39 of the rolling diaphragm 35. Thereafter, the space 26 is again pressurized to pretighten the diaphragm 35 and cause it to move to a locking position. It is understood, of course, that the retaining ring 51 has previously been positioned upon the shell member 25 as shown in FIGURE 7 prior to the time that the end 39 of the diaphragm wall 35 is moved upwardly over the open end of the shell 25 to the position shown in FIGURE 9.

The shock absorber assembled in the manner shown in FIGURE 9 is then removed from the machine fixture and placed in a machine fixture 125 having a holding member 126 that has an opening 127 that receives the retaining ring 51, the shock absorber being supported in the holding fixture of FIGURE 10 on the retaining ring 51. A force applying member 130 then engages the stud end 81 of the shock absorber to urge it downwardly and force the retaining ring in an upward direction to effect a forceful setting of the retaining ring 51 on the end 39 of the rolling diaphragm 35 by which a friction fluid seal is established on the open end of the shell member 25.

While the embodiments of the present invention as herein disclosed constitute preferred forms, it is to be understood that other forms might be adopted.

What is claimed is as follows:

1. In a method of assembly of a resilient rolling diaphragm wall on a direct-acting tubular type shock absorber having a generally cylindrical outer shell partially encircled by a generally cylindrical shell member in spaced relation to said outer shell and movable telescopically with an open end thereof over said outer shell with the diaphragm wall having ends carried by said outer shell and said shell member, the steps of, assembling a resilient cylindrical diaphragm wall on the periphery of an outer shell of the shock absorber with one end of the diaphragm wall turned back upon itself to lie upon the diaphragm wall portion supported by said outer shell and terminating in a free end, engaging said free end of said diaphragm wall with said open end of said shell member, and supplying fluid pressure into the space between said outer shell and said shell member for delivery between the doubled portions of the diaphragm wall to radially separate the same thereby while concurrently moving said diaphragm free end longitudinally over the open end of said shell member for placement thereon.

2. In a method of assembly of a resilient rolling diaphragm wall on a direct-acting tubular type shock absorber having a generally cylindrical outer shell partially encircled by a generally cylindrical shell member in spaced relation to said outer shell and movable telescopically with an open end thereof over said outer shell with the diaphragm wall having ends carried by said outer shell and said shell member, the steps of, shaping said open end of said shell member before assembly on the shock absorber with an annular bead portion, assembling a resilient cylindrical diaphragm wall on the periphery of the outer shell of the shock absorber with one end of the diaphragm wall turned back upon itself to lie upon the diaphragm wall portion supported by said outer shell and terminating in a free end, engaging said free end of said diaphragm wall with said open end of said shell member, and supplying fluid pressure into the space between said outer shell and said shell member for delivery between the doubled portions of the diaphragm wall to radially separate the same thereby while concurrently moving said diaphragm free end longitudinaly over the open end of said shell member and over the bead portion thereof for retention on the bead portion of said shell member.

3. In a method of assembly of a resilient rolling diaphragm wall on a direct-acting tubular type shock absorber having a generally cylindrical outer shell partially encircled by a generally cylindrical shell member in spaced relation to said outer shell and movable telescopically with an open end thereof over said outer shell with the diaphragm wall having ends carried by said outer shell and said shell member, the steps of, shaping said open end of said shell member before assembly on the shock absorber with a first truncated cone-shaped portion enlarged in diameter in an axial direction away from said open end and with a second truncated cone-shaped portion coextensive with the first portion of diminishing diameter in an axial direction away from said open end, assembling a resilient cylindrical diaphragm wall on the periphery of the outer shell of the shock absorber with one end of the diaphragm wall turned back upon itself to lie upon the diaphragm wall portion supported by said outer shell and terminating in a free end, engaging said free end of said diaphragm wall with the small diameter end of said first truncated cone-shaped portion of said shell member, and supplying fluid pressure into the space between said outer shell and said shell member for delivery between the doubled portions of the diaphragm wall to radially separate the same thereby while concurrently moving said diaphragm free end longitudinally over the said first truncated cone-shaped portion of said shell member and thence over said second truncated cone-shaped portion thereof for placement of the said free end of said diaphragm wall adjacent the small diameter portion of said second truncated cone-shaped portion of said shell member.

4. A method of assembly of a resilient rolling diaphragm wall on a direct-acting tubular type shock absorber as set forth in claim 3 which includes the steps of placing an annular locking ring around said second truncated cone-shaped portion of said shell member before moving said diaphragm free end longitudinally over the open end of said shell member and after placement of the said free end of said diaphragm wall adjacent the small diameter portion of said truncated cone-shaped portion of said shell member of moving said locking ring axially relative to the said free end of said diaphragm wall and in engagement therewith to effect frictional locking of said free end of said diaphragm wall on said second truncated cone-shaped portion of said shell member.

5. In a method of assembly of a resilient rolling diaphragm wall on a direct-acting tubular type shock absorber having a generally cylindrical outer shell partially encircled by a generally cylindrical shell member in spaced relation to said outer shell and movable telescopically with an open end thereof over said outer shell with the diaphragm wall having ends carried by said outer shell and said shell member, the steps of, shaping the generally cylindrical outer shell of the shock absorber before assembly with an annular recessed portion of smaller diameter than the cylindrical diameter of the outer shell, placing a cylindrical diaphragm wall retaining sleeve around said outer shell in the area of said recessed portion, assembling a resilient cylindrical diaphragm wall on the periphery of said outer shell with one end of the diaphragm wall disposed in the recessed portion of said outer shell and between the same and said retaining sleeve, moving said outer shell longitudinally into said retaining sleeve and relative to said diaphragm to cause said one end of said diaphragm wall to move longitudinally onto the larger diameter of said outer shell for frictional clamping of said one end of said diaphragm wall between said outer shell and said retaining sleeve, thereafter folding the opposite end of the diaphragm wall upon itself to lie upon the diaphragm wall portion supported by said outer shell, engaging said opposite end of said diaphragm wall with the open end of said shell member, and supplying fluid pressure into the space between said outer shell and said shell member for delivery between the diaphragm wall portions in the doubled portion thereof to radially separate the doubled portion of the diaphragm wall from the portion supported by said outer shell while concurrently moving said opposite end of the diaphragm wall longitudinally over the open end of said shell member for placement thereon.

References Cited by the Examiner
UNITED STATES PATENTS 2,733,572  2/56  Butterfield et al. _____ 29—450 XR WHITMORE A. WILTZ, *Primary Examiner.*